United States Patent
Malipatil et al.

(10) Patent No.: US 8,705,672 B2
(45) Date of Patent: Apr. 22, 2014

(54) METHOD OF COMPENSATING FOR NONLINEARITY IN A DFE-BASED RECEIVER

(75) Inventors: Amaresh Malipatil, San Jose, CA (US); Mohammad Mobin, Orefield, PA (US); Pervez Aziz, Dallas, TX (US); Ye Liu, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 222 days.

(21) Appl. No.: 13/244,985

(22) Filed: Sep. 26, 2011

(65) Prior Publication Data

US 2013/0077669 A1    Mar. 28, 2013

(51) Int. Cl.
*H04L 27/08* (2006.01)

(52) U.S. Cl.
USPC .......................................................... 375/345

(58) Field of Classification Search
CPC .......................... H04L 25/03057; H04L 27/01
USPC .......................................................... 375/345
See application file for complete search history.

(56) References Cited

U.S. PATENT DOCUMENTS

| | | | |
|---|---|---|---|
| 5,396,517 A * | 3/1995 | Yedid et al. | 375/233 |
| 5,524,124 A | 6/1996 | Koenig | |
| 6,188,722 B1 * | 2/2001 | Velez et al. | 375/233 |
| 6,792,040 B1 * | 9/2004 | Davis et al. | 375/222 |
| 7,016,406 B1 | 3/2006 | Phanse et al. | |
| 7,440,497 B2 | 10/2008 | Balan et al. | |
| 7,526,022 B2 | 4/2009 | Nieto | |
| 7,551,668 B2 * | 6/2009 | Higashino et al. | 375/232 |
| 7,599,461 B2 | 10/2009 | Aziz et al. | |
| 7,616,686 B2 | 11/2009 | Aziz et al. | |
| 7,636,408 B2 | 12/2009 | Bau et al. | |
| 7,696,800 B2 | 4/2010 | Azimi et al. | |
| 2003/0035495 A1 * | 2/2003 | Laamanen et al. | 375/296 |
| 2006/0056502 A1 * | 3/2006 | Callicotte et al. | 375/232 |
| 2011/0090947 A1 * | 4/2011 | Peng et al. | 375/233 |

OTHER PUBLICATIONS

Kasturia, Sanjay and Winters, Jack H.; Techniques for High-Speed Implementation of Nonlinear Cancellation; IEEE Journal on Selected Areas in Communications; Jun. 1991; vol. 9, No. 5; pp. 711-717.

Kerpen, G.S.M.; Data-Aided Equalization Using Receivers with a Restricted Decoding-Delay; Eindhoven University of Technology, Department of Electrical Engineering, Graduate Report; Oct. 1987.

* cited by examiner

Primary Examiner — Juan A Torres

(57) ABSTRACT

A receiver has an input and a decision feedback equalizer (DFE). The DFE couples to the receiver input and has at least one tap coefficient. An input signal, having a first amplitude level insufficient to cause significant non-linear distortion in the receiver, is applied to the receiver input. After the DFE adapts to the applied input signal having the first amplitude level by adjusting the at least one tap coefficient, the adaptation process is stopped. Then the at least one tap coefficient is scaled by a factor $\alpha$ and the amplitude of input signal is adjusted to a second amplitude level greater than the first amplitude level by the scale factor $\alpha$. Although the second amplitude level might be sufficient to cause significant nonlinear distortion in the receiver, the scaled tap coefficient has the correct values for proper DFE operation in the presence of the non-linear distortion.

32 Claims, 4 Drawing Sheets

METHOD OF COMPENSATING FOR NONLINEARITY IN A DFE-BASED RECEIVER

TECHNICAL FIELD

The present invention relates to decision-feedback equalization techniques, and, in particular, to techniques for compensating for nonlinear distortion in receivers incorporating a decision-feedback equalizer.

BACKGROUND

Digital communication receivers must sample an analog waveform and then reliably detect the sampled data. Signals arriving at a receiver are typically corrupted by intersymbol interference (ISI), crosstalk, echo, and other noise. Thus, receivers must both equalize the channel, to compensate for such corruptions, and detect the encoded signals at increasingly higher clock rates. Decision-feedback equalization (DFE) is a widely used technique for removing intersymbol interference and other noise. For a detailed discussion of decision feedback equalizers, see, for example, *Digital Communication Principles* by R. Gitlin et al (Plenum Press 1992) and *Digital Communications* by E. A. Lee and D. G. Messerschmitt (Kluwer Academic Press, 1988), each incorporated by reference herein in their entirety.

Generally, decision-feedback equalization utilizes a nonlinear equalizer to equalize the channel using a feedback loop based on previously detected (or decided) data. In one typical DFE implementation, a received analog signal is sampled after DFE correction and compared to one or more thresholds to generate the detected data. The DFE correction, v(t), is subtracted in a feedback fashion to produce a DFE-corrected signal w(t). A clock, generated from the received signal by a Clock and Data Recovery (CDR) circuit, is generally used to sample the DFE-corrected signal and for the DFE operation. An example of such a receiver is disclosed in "Method and Apparatus for Generating One or More Clock Signals for a Decision-Feedback Equalizer Using DFE Detected Data", by Aziz et al, U.S. Pat. No. 7,616,686, incorporated by reference herein in its entirety, utilizes a DFE-based phase detection architecture for clock and data recovery of a DFE-corrected signal.

A DFE-based receiver includes an analog front end (AFE), typically used to control the input signal level and equalize for linear, frequency-based distortions in the input signal to the receiver. However, the analog circuitry in the AFE has inherent limitations, one of which is the maximum amplitude the circuitry can handle before significant non-linear distortion occurs. For example, should one or more amplifiers in the AFE begin to saturate, i.e., limit, signals into or out of the amplifiers, nonlinear distortion of the input signal results. This nonlinear behavior is typically measured by specifying the input signal to the AFE that results in a 1 dB compression in the output signal of the AFE compared to a non-compressed AFE output signal. Presence of the nonlinear distortion in the input signal might cause suboptimal adaptation by the DFE to the input signal, resulting in possible poor performance by the receiver, e.g., a high bit error rate. This is particularly problematic in backplane bus communication system where compatibility with a defined standard and high-speed operation are required. For example, a standard referred to as "low-voltage differential signaling" (LVDS) is commonly used for backplane communications. LVDS sets a 350 mV peak-to-peak signal requirement with a common mode voltage of 1.2 V for data signals being transmitted, resulting in a peak voltage of approximately 1.375 volts. Generally, as the data rates increase and transistor sizes shrink to handle the higher data rates, the 1 dB compression point of an amplifier is concomitantly reduced due to supply voltage limitations inherent with smaller transistors. As data rates exceed 2 gigabits/second (Gbps), the semiconductor technology used to implement the receiver handling such high speeds has a maximum supply voltage limit, e.g. 1.5 volts, that begins to approach the amplitude peaks of the signals being received, resulting in significant nonlinear distortion. A typical solution is to attenuate the input signals to well below the AFE's 1 dB compression point to keep the input signals in the AFE's linear range. This will allow the AFE circuitry in the receiver to handle these signals without distortion but reduces the noise immunity of the receiver, degrading its bit error rate (BER).

Thus, it is desirable to provide a method to allow a receiver operate properly with input signals that might cause nonlinear distortion within the receiver.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment, a method of operating a system that includes a receiver, the receiver has an input and a decision feedback equalizer (DFE). The DFE couples to the receiver input and has at least one tap coefficient. An input signal is applied to the receiver input, the input signal having a first amplitude level insufficient to cause significant non-linear distortion in the receiver. After the DFE adapts to the applied input signal having the first amplitude level by adjusting the at least one tap coefficient, the adaptation process is stopped. Then the at least one tap coefficient is scaled by a factor $\alpha$ and the amplitude of input signal to a second amplitude level, the second amplitude level being greater than the first amplitude level by the scale factor $\alpha$.

In another embodiment, a method of operating a system that includes a receiver, the receiver has an input, an analog front end (AFE) coupled to the receiver input, a quantizer coupled to the AFE, a decision feedback equalizer (DFE) having at least one tap coefficient and coupled to the quantizer, a subtractor producing an error signal and having a first input coupled to receiver input and a second input coupled to the AFE, and a multiplier disposed between the quantizer and the second input of the subtractor and responsive to an adaptable weighting factor. An input signal is applied to the receiver input, the input signal having a first amplitude level insufficient to cause significant non-linear distortion in the receiver. The DFE and the AFE then adapt to the applied input signal having the first amplitude level by adjusting the at least one tap coefficient and the adaptable weighting factor in response to the error signal. The adaptation by the DFE and the AFE are subsequently stopped and the at least one tap coefficient is scaled by a factor $\alpha$. Next, the amplitude of input signal is adjusted to a second amplitude level, the second amplitude level being greater than the first amplitude level by the scale factor $\alpha$, and the adaptable weighting factor is adapted to the applied input signal having the second amplitude level.

In still another embodiment of a system that includes a receiver, the receiver has an input, a variable gain amplifier (VGA) coupled to the receiver input, a quantizer coupled to the VGA, a decision feedback equalizer (DFE) having at least one tap coefficient and coupled to the quantizer, a subtractor producing an error signal and having a first input coupled to receiver input and a second input coupled to the VGA, and a multiplier disposed between the quantizer and the second input of the subtractor and responsive to an adaptable weighting factor. An input signal is applied to the receiver input, the input signal having a first amplitude level insufficient to cause significant non-linear distortion in the receiver, and the VGA gain, the adaptable weighting factor, and the DFE adapt to the applied input signal having the first amplitude level by adjusting the at least one tap coefficient, the VGA gain, and the adaptable weighting factor in response to the error signal. Then the adaptations are stopped and the at least one tap coefficient is scaled by a factor $\alpha$. The amplitude of input signal is adjusted to a second amplitude level, the second amplitude level being greater than the first amplitude level by the scale factor $\alpha$, and the adaptable weighting factor is adapted to the applied input signal having the second amplitude level.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

In addition to the patents referred to herein, each of the following patents and patent applications are incorporated herein in their entireties:

U.S. Pat. No. 7,599,461, titled "Method and Apparatus for Generating One or More Clock Signals for a Decision-Feedback Equalizer Using DFE Detected Data in the Presence of an Adverse Pattern", by Aziz et al.

U.S. patent application Ser. No. 12/776,681, now U.S. Pat. No. 8,467,440 filed "((All Compensated Phase Detector for Generating One or More Clock Signals Using DFE Detected Data in a Receiver", by Aziz et al.

As data rates increase for serializer/deserializer (SERDES) applications, the channel quality degrades and the use of decision feedback equalization (DFE) in conjunction with finite impulse response (FIR) filter and a receiver equalizer within a receiver (RX) is generally used to achieve the bit error rate (BIER) performance needed for reliable communications. It is understood that the FIR function of the transmitter (TX) can be moved from the transmitter to the receiver and incorporated into the receiver's analog front end (AFE).

Figure 1:
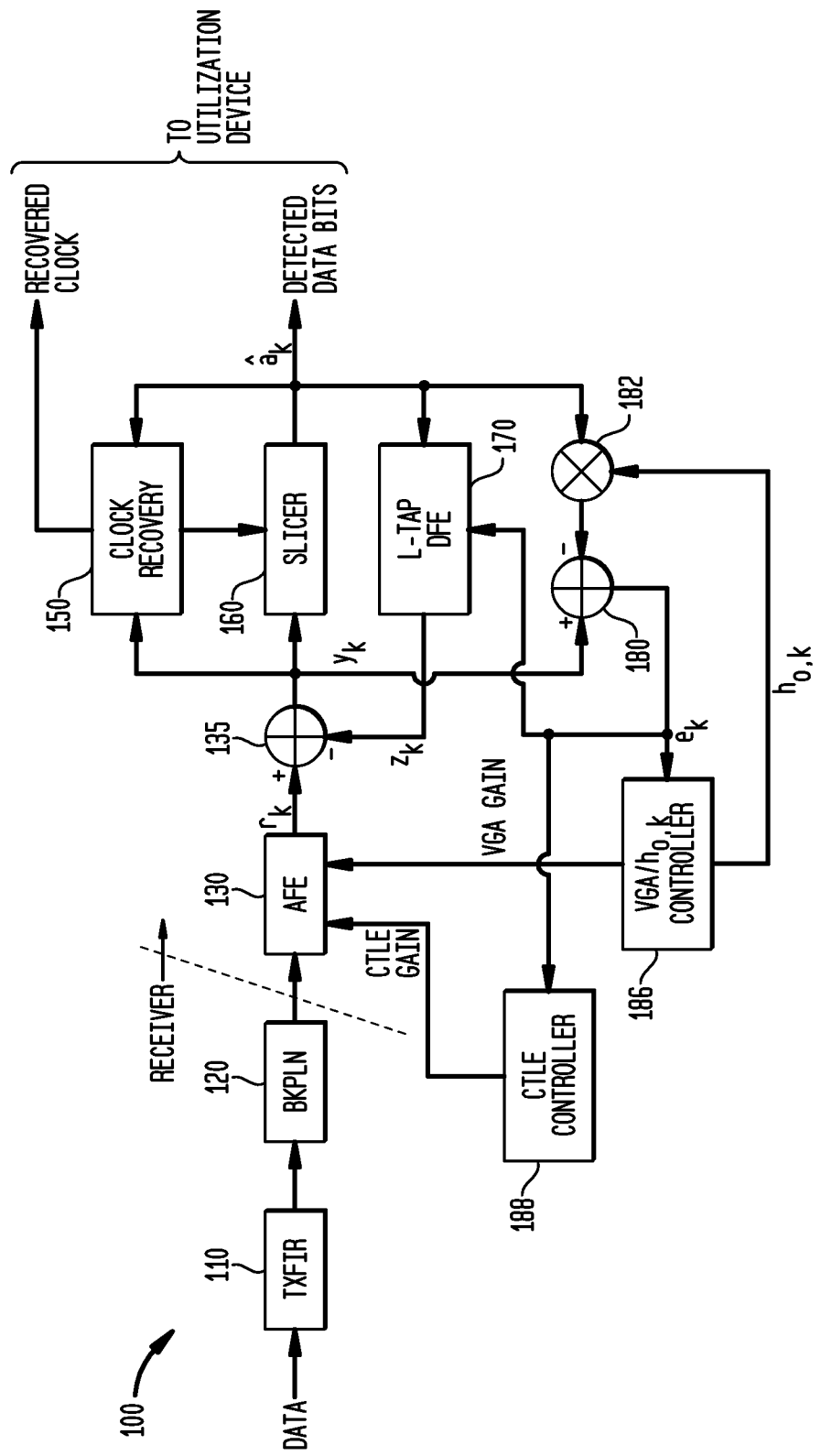
FIG. 1 is a simplified block diagram of a serializer/deserializer (SERDES) communication channel having a receiver incorporating an analog front end (AFE) and a DFE-based equalizer.

FIG. 1 is a block diagram of a typical SERDES communication channel 100 that incorporates a traditional DFE-based equalizer in addition to the TX and RX equalization. As shown in FIG. 1, the data is transmitted through a backplane channel 120 after optionally being equalized or filtered through a transmit FIR filter (TXFIR) 110. After passing through the backplane (BKPLN) 120, metal traces in a substrate (not shown), or a cable (not shown), the analog signal may optionally be filtered or equalized by an analog front end (AFE) 130 having an variable gain amplifier (not shown) for amplitude control and may include, for example, a continuous-time filter. The analog signal output $r_k$ of the AFE 130 passes through subtractor 135, used in conjunction with an decision feedback equalizer (DFE) 170 having L taps and described below, and is then sampled by a clock/data recovery (CDR) circuit 150. A slicer 160 (described below) digitizes the output $y_k$ of the subtractor 135 by comparing the sample to an exemplary threshold of zero in response to the data clock generated by the CDR 150 and latches the result.

As previously indicated, the slicer 160 can be implemented as a slicer-latch (i.e., a decision device based on an amplitude threshold and a latch to hold the results of the decision device) or a more complicated detector such as a sequence detector. For high-speed applications, the slicer 160 is often implemented as a slicer-latch that is clocked by a CDR-generated clock. In addition to sampling the data signal, the slicer 160 essentially quantizes the signal to a binary "1" or "0" based on the sampled analog value and a slicer threshold, $s_t$. If the input to the slicer 160 at time k is $y_k$, then the detected data bit output, $\hat{a}_k$ of the slicer 160 is given as follows:

$$\hat{a}_k = 1 \text{ if } y_k > s_t$$
$$= 0 \text{ otherwise.}$$

In this example, the slicer 160 has a slicer threshold $s_t$ of zero.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a slicer 160, the data is recovered properly despite the fact that the phase and frequency of the transmitted signal is not known. The CDR 150 is conventional and is often an adaptive feedback circuit and the feedback loop must adjust the phase and frequency of the nominal clock to produce a modified recovered clock that can sample the analog waveform to allow proper data detection.

In general, the CDR 150 may be composed of several components, such as a phase detector, a loop filter, and a clock generation circuit (not shown). In one embodiment, the CDR 150 comprises a bang-bang phase detector (BBPD). For a general discussion of bang-bang phase detectors, see, for example, J. D. H. Alexander, "Clock Recovery from Random Binary Signals," Electronics Letters, 541-42 (October, 1975), incorporated by reference herein in its entirety. Alternatively, the CDR 150 comprises a Mueller-Muller CDR where the signals are sampled at the baud-rate. For a general discussion of Mueller-Muller CDR, see, for example, K. Mueller and K. Muller, "Timing Recovery in Digital Synchronous Data Receivers," IEEE Trans. Comm., Vol. 24, No. 5, May 1976, pp. 516-531, incorporated by reference herein in its entirety.

Exemplary operation of L-tap DFE 170 in FIG. 1 is as follows. It is noted that the DFE equalizer described herein is well known and considered an analog implementation because compensation is done in the analog domain even though part of the equalizer is implemented in digital form. A DFE correction, $z_k$, generated by a DFE filter 170 is subtracted by an analog summer 135 from the output, $r_k$, of the AFE 130 to produce a DFE corrected signal $y_k$, where $y_k = r_k - z_k$. Then the DFE-corrected signal $y_k$ is detected by a slicer 160 to produce the detected data bits $\hat{a}_k$.

Because the output of slicer 160 (the detected data bits $\hat{a}_k$) is used by filter 170 to produce the DFE output $z_k$, the filter 170 uses past corrected detected data to produce the DFE output $z_k$. For one embodiment of the filter 170, the output of the DFE filter 170 is:

$$z_k = \sum_{i=1}^{L} b(i)\hat{a}_k(-i)$$

where b(i) represents the coefficients or weights of the L-tap DFE filter 170 and $\hat{a}_k(-i)$ represents past data decisions from the sheer 160. Further explanation of the filter 170 and alternative embodiments thereof may be found in the above-referenced patent by Aziz et al, titled "Compensated Phase Detector for Generating One or More Clock Signals Using DFE Detected Data in a Receiver". The value of the tap weights b(i) is determined during a training period by analyzing an error signal, $e_k$, described in more detail below. Generally and as well understood in the art, a controller (not shown) coupled to the DFE 170 varies the tap weights using, an exemplary least-mean-squared (LMS) algorithm to minimize the error signal $e_k$. Alternatively, other iterative adaptation algorithms may be used.

Figure 2:
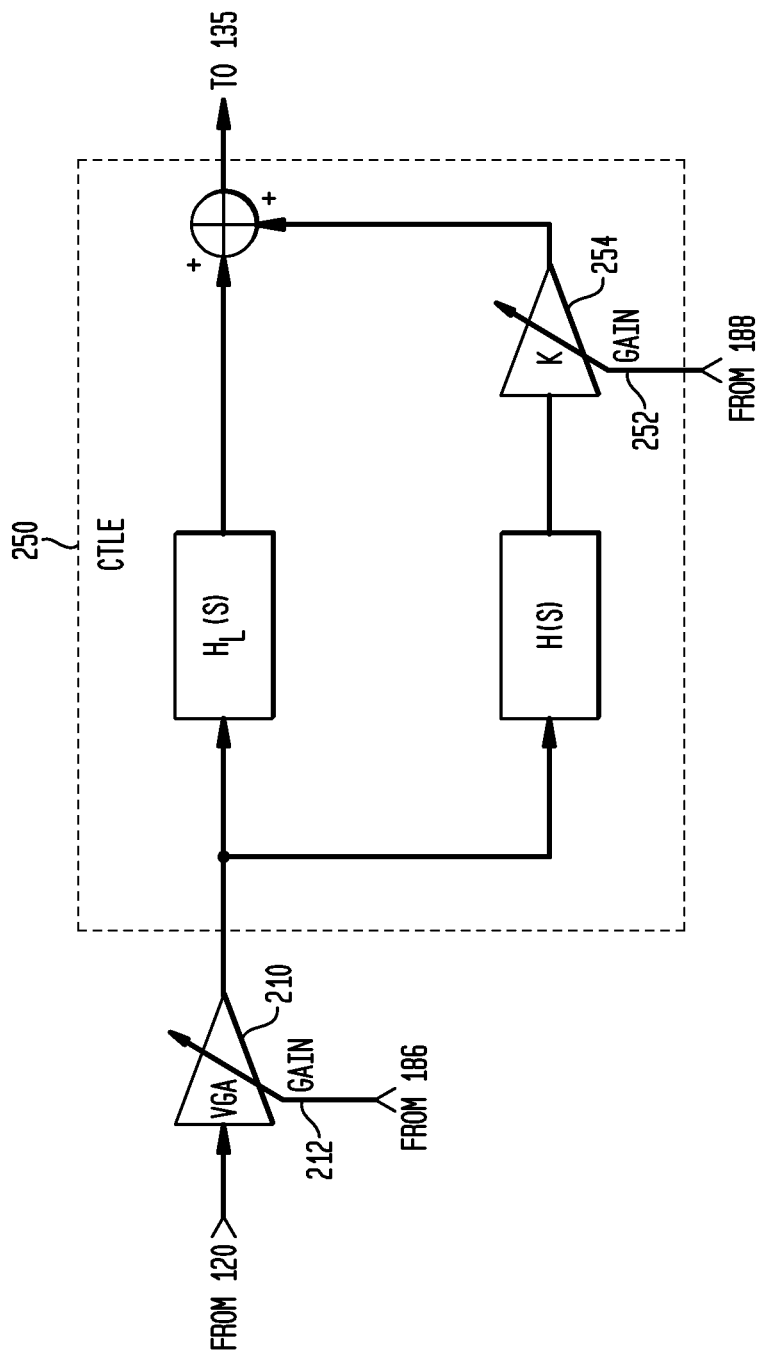
FIG. 2 is a simplified block diagram of the analog front end (AFE) of the receiver shown in FIG. 1.

FIG. 2 diagrams the details of the AFE 130. In this embodiment, a variable gain amplifier (VGA) 210 receives input signals from the backplane 120 (FIG. 1). The VGA 210 has an adjustable gain input 212 that may be analog or digital in nature. The output of the VGA drives an optional continuous-time linear equalizer (CTLE) 250 that is well known in the art. The operation of the CTLE 250 will not be described in more detail here except that the CTLE 250 has an input 252 that allows for adjustment of one or more coefficients in the CTLE 250 by changing the gain of a variable gain amplifier 254. A change in the one or more coefficients of the CTLE 250 will change the frequency-dependent characteristics of the input signals. Thus, by asserting the appropriate coefficient values on input 252, the CTLE 250 will at least partially compensate for dispersion and other frequency-dependent distortions due to the transmission path in the backplane 120. Setting of the coefficient values will be discussed in more detail below in connection with FIGS. 3 and 4.

Returning to FIG. 1, an error signal $e_k$ is generated by subtractor 180 taking the difference between the DFE-corrected signal $y_k$ and a weighted version of the detected data bit generated by multiplier 182 multiplying together the detected data bit value $\hat{a}_k$ and a weight $h_{0,k}$. The weight, $h_{0,k}$, is referred to herein as an adaptable weighting factor at time k and is generated by controller 186 as will be described in more detail in connection with FIG. 4. Controller 186 also generates the VGA gain control signal for setting the gain of the VGA 210 (FIG. 2) as will be described in more detail in connection with FIG. 4.

The controller 188 generates the control signal for adjusting the one or more coefficient values of the CTLE 250 (FIG. 2). During the training or adaptation phase, the controller 188, responsive to the error signal $e_k$, converges one or more coefficient values of the CTLE 250 either to reduce intersymbol interference during eye openings or to reduce signal transition jitter. Either technique is well known in the art and is similar to the DFE adaptation technique described above. Alternatively, the CTLE 250 may be manually configured by a user entering coefficient values for the CTLE 250 or by using predetermined coefficient values.

Figure 3:
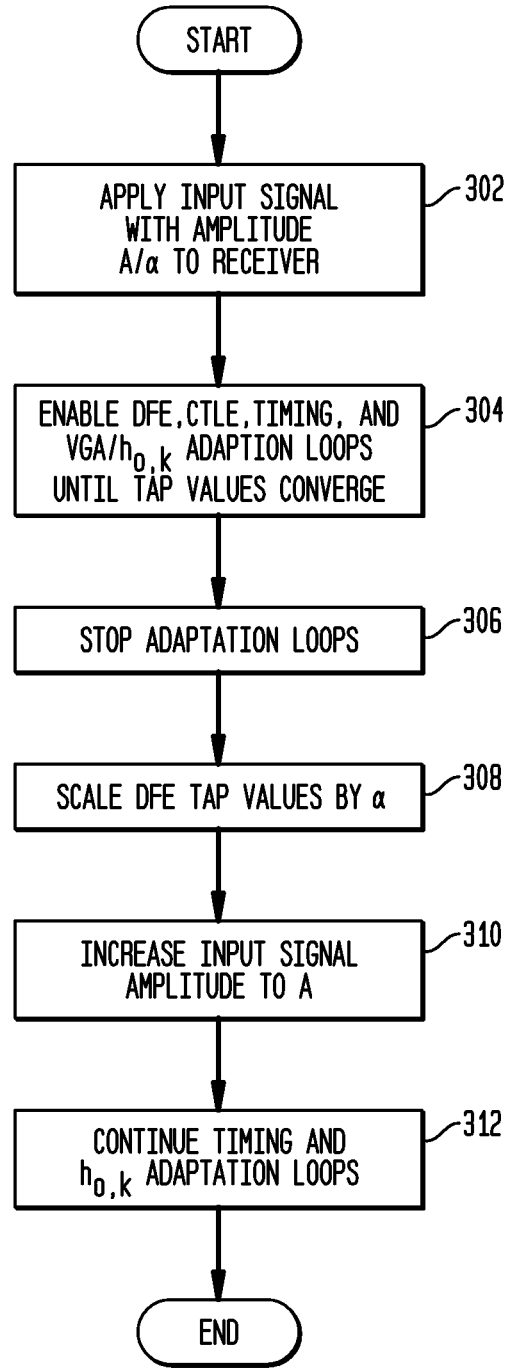
FIG. 3 is a simplified flowchart illustrating operation of the receiver of FIG. 1 during adaptation of the receiver to an input signal.

Adaptation by the receiver in FIG. 1 to an input signal is illustrated in the flowchart of FIG. 3. The exemplary adaptation process 300 shown in FIG. 3 begins with step 302 where an input signal, e.g., a training signal but may be a signal carrying data, having an approximate amplitude of A/α is applied to an input of the AFE 130 (FIG. 1). This amplitude is chosen to be low enough that the VGA and CTLE circuitry in the AFE 130 does not exhibit any significant amount of non-linear distortion but is high enough for the receiver 100 to properly adapt to the attenuated input signal as described below. In one example, α=5. In one embodiment, the transmit filter, TXFIR 110, has adjustable gain to control the amplitude of signals applied to the backplane 120. Alternatively, an attenuator (not shown) disposed between the backplane 120 and the AFE 130 may be used to set the amplitude of the input signal to the AFE 130.

After the input signal is applied in step 302, in step 304 the DFE 170 (FIG. 1) begins adapting to the input signal, along with the VGA/$h_{0,k}$ controller 186, CTLE controller 188, and clock recovery circuit 150. The various adaptation algorithms may be operated concurrently or consecutively as desired.

Figure 4:
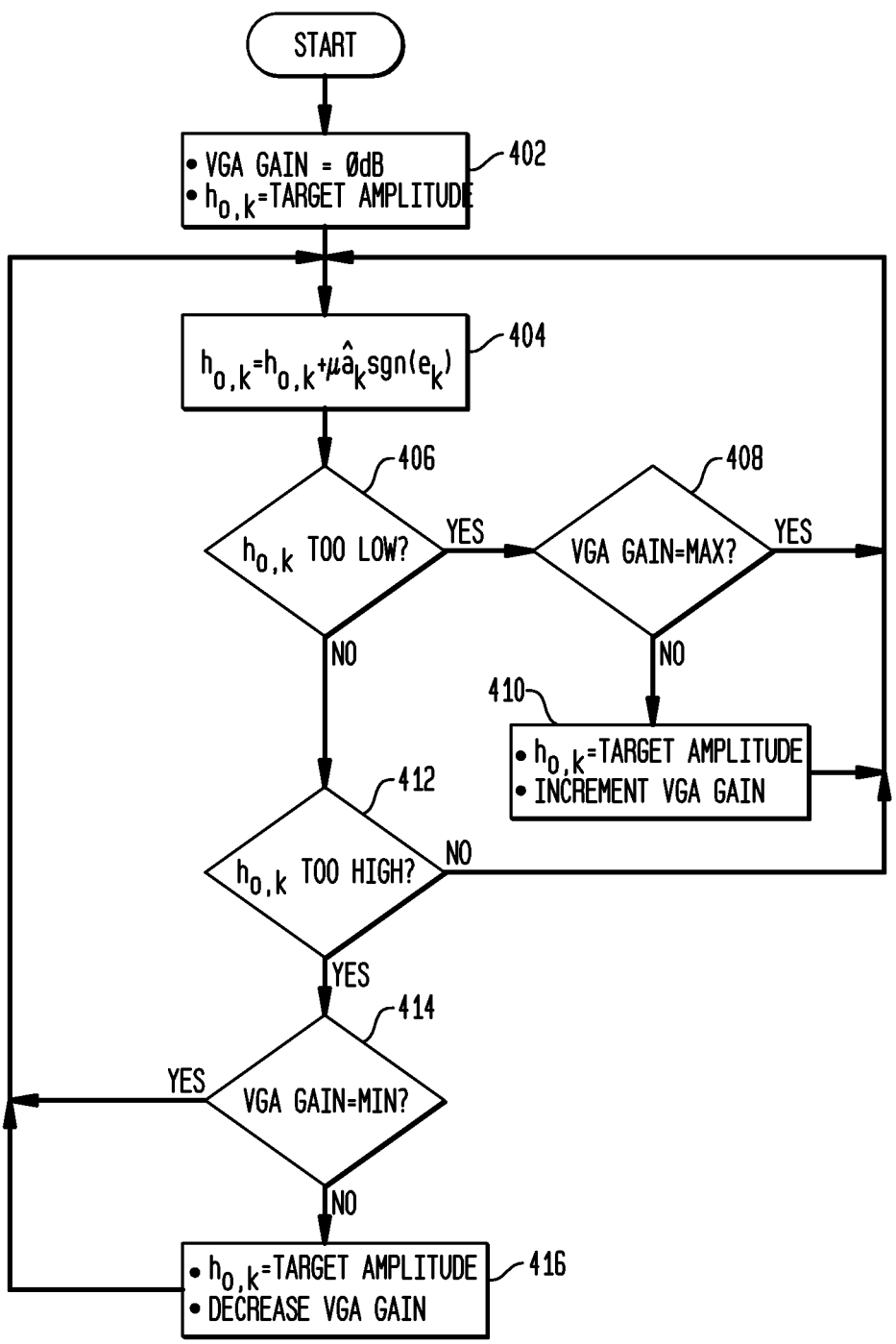
FIG. 4 is a simplified flow chart illustrating additional details regarding one portion of the adaptation process in FIG. 3.

Turning temporarily to FIG. 4, an exemplary VGA/$h_{0,k}$ adaptation process performed by controller 186 in step 304 (FIG. 3) is described in more detail herein. As illustrated in FIG. 4, the VGA/$h_{0,k}$ adaptation 400 begins by setting the VGA gain to an initial gain value, here 0 dB, and setting the adaptable weighting factor, $h_{0,k}$, to a target amplitude or value in step 402. Next, the weighting factor is updated in step 404 using the detected data bit $\hat{a}_k$ multiplied by the sign of the error signal $e_k$, and scaled by scale factor μ. The value of the scale factor μ is selected to be large enough to achieve a fast convergence of $h_{0,k}$ but small enough to allow convergence without erratic swings in $h_{0,k}$ during convergence, as is discussed in more detail in, for example, *Adaptive Filter Theory* by Simon Haykin (Prentice Hall, 2002) incorporated by reference herein in its entirety. In this embodiment, μ may range from approximately $10^{-8}$ to approximately $10^{-4}$.

After $h_{0,k}$ is updated in step 404, $h_{0,k}$ is checked to determine if it is too small in step 406. If $h_{0,k}$ is too small, then the gain of the VGA 210 (FIG. 2) is checked to determine if it is set to its maximum value and control returns to step 404 if the gain of the VGA is set to the maximum value. If, however, in step 408 the VGA gain is not set to the maximum value, then in step 410 $h_{0,k}$ is reset to the target amplitude and the VGA gain is increased (by 1 dB in this example although other values may be used), and control passes back to step 404.

Returning to step 406, if $h_{0,k}$ is not too small, then in step 412 $h_{0,k}$ is checked to see if it is too large and control passes back to step 404 if $h_{0,k}$ is not too large. However, if $h_{0,k}$ is too large, control passes to step 414 where the VGA gain is checked to see if it is set to a minimum value. If the VGA gain is set to the minimum value, control passes back to step 404. If, however, the VGA gain is not set to the minimum value, control passes to step 416 where $h_{0,k}$ is reset to the target amplitude and the VGA gain is decreased (by 1 dB in this example although another value may be used and may be different in magnitude from magnitude the gain is increased in step 410), and control passes back to step 404.

Returning to step 304 in FIG. 3, once all the adaptation loops converge, i.e., the filter coefficients, the weighting factor, gain, etc. reach a steady-state or no longer significantly change, control passes to step 306 where operation, such as the repeated execution, of all of the adaptation loops is terminated. Next, in step 308, the coefficients of the DFE 170

(FIG. 1) are scaled by a factor α and in step 310 the amplitude of the input signal is set to a value A, i.e. the signal amplitude is increased by the factor α from the amplitude used during receiver adaptation, and is usually the amplitude defined by a standard or the like. Alternatively, the amplitude of the input signal in step 302 may be set to a value A and the signal amplitude in step 310 is set to approximately αA, usually the amplitude defined by standard or the like. Regardless, the ratio of the amplitudes between the signal amplitude in step 310 to the signal amplitude in step 302 is approximately α. This allows the receiver to adapt itself, specifically parameters described herein, to a signal without significant nonlinear distortion and continue to operate satisfactorily when the input signal amplitude is large enough to cause significant nonlinear distortion in the AFE 130 (FIG. 1).

Lastly, in step 312, operation by the clock recovery by circuit 150 (FIG. 1) suspended in step 306 is reinstated and updating of $h_{0,k}$ is resumed by executing step 404 (FIG. 4) repeatedly. No further adjustments to the tap weights in the DFE 170, VGA gain value, or CTLE coefficients occur until the entire adaptation process 300 is restarted, such as during a reset of the receiver 100.

Alternatively, the timing loops by clock recovery circuit 150 may continue to operate during steps 306-310 instead of being suspended as described above.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. In a system including a receiver, the receiver having an input and a decision feedback equalizer (DFE), the DFE coupled to the receiver input and having at least one tap coefficient, a method comprising:

a) applying an input signal to the receiver input, the input signal having a first amplitude level insufficient to cause significant non-linear distortion in the receiver;

b) adapting the DFE to the applied input signal having the first amplitude level by adjusting the at least one tap coefficient;

c) stopping the adaptation by the DFE;

d) scaling the at least one tap coefficient by a factor α; and e) adjusting the amplitude of input signal to a second amplitude level, the second amplitude level being greater than the first amplitude level by the scale factor α.

2. The method of claim 1, the receiver further includes an analog front end (AFE) coupled between the receiver input and the DFE, wherein step b) further comprises adapting the AFE to the applied input signal having the first amplitude level and, in step c), stopping the adaptation of the AFE.

3. The method of claim 1, wherein the receiver further includes an adaptive timing loop for generating a clock signal from signals applied to the receiver input, wherein the timing loop continues to adapt in step c).

4. The method of claim 1, the receiver further includes a quantizer disposed between the receiver input and the DFE, a subtractor producing, an error signal and having a first input coupled to the receiver input and a second input coupled to the quantizer, and a multiplier disposed between the quantizer and the second input of the subtractor and responsive to an adaptable weighting factor, wherein an adaptation loop additionally adjusts the adaptable weighting, factor in step b) and the DFE adapts to the input signal in step b) in response to the error signal.

5. The method of claim 1, wherein an attenuator is coupled to the receiver input and controls the amplitude level of the input signal in steps a) and e).

6. The method of claim 1, wherein a transmitter supplies the input signal and controls the amplitude level of the input signal in steps a) and e).

7. The method of claim 2, the AFE includes a variable gain amplifier (VGA) and a filter disposed in series, the VGA having an adjustable gain and the filter having at least one adaptable coefficient.

8. The method of claim 4, the adaptable weighting factor continues to be adapted in step c) by the adaptation loop.

9. The method of claim 6, wherein the transmitter is coupled to the receiver input by a transmission line in a backplane.

10. The method of claim 7, Wherein the filter is continuous-time linear equalizer that is adapted concurrently with the DFE.

11. In a system including a receiver, the receiver having an input, an analog front end (AFE) coupled to the receiver input, a quantizer coupled to the AFE, a decision feedback equalizer (DFE) having at least one tap coefficient and coupled to the quantizer, subtractor producing an error signal and having a first input coupled to receiver input and a second input coupled to the AFE, and as multiplier disposed between the quantizer and the second input of the subtractor and responsive to an adaptable weighting factor, a method comprising:

a) applying an input signal to the receiver input, the input signal having a first, amplitude level insufficient to cause significant non-linear distortion in the receiver;

b) adapting the DFE and the AFE to the applied input signal having the first amplitude level by adjusting the at least one tap coefficient and the adaptable weighting factor in response to the error signal;

c) stopping the adaptation by the DFE and the AFE;

d) scaling the at least one tap coefficient by a factor $\alpha$;

e) adjusting the amplitude of input signal to a second amplitude level, the second amplitude level being greater than the first amplitude level by the scale factor $\alpha$; and f) adapting the adaptable weighting factor to the applied input signal having the second amplitude level.

12. The method of claim 11, wherein the receiver further includes an adaptive timing loop for generating a clock signal from signals applied to the receiver input, and wherein the timing loop continues to adapt in step c).

13. The method of claim 11, wherein an attenuator is coupled to the receiver input and controls the amplitude level of the input signal in steps a) and e).

14. The method of claim 11, wherein the AFE includes a variable gain amplifier (VGA) having an adaptable gain, wherein the adaptable gain of the VGA is adapted in step b) and is stopped from adaptation in step c).

15. The method of claim 11, wherein a transmitter supplies the input signal and controls the amplitude level of the input signal in steps a) and e).

16. The method of claim 14, wherein the AFE includes a continuous-time linear equalizer (CTLE) disposed in series with the VGA, the CTLE haying at least one adaptable coefficient adapted concurrently with the DFE.

17. The method of claim 14, wherein the step of adapting the VGA gain and the adaptable weighting factor to the applied input signal having the first amplitude level by adjusting the adaptable weighting factor in response to the error signal in step b) further comprises the steps of:

g) setting, the VGA gain and the adaptable weighting factor to an initial value and a target value, respectively;

h) adjusting the adaptable weighting factor by a coefficient dependent on the error signal;

i) increasing the VGA gain if the adaptable weighting factor is less than a lower threshold value;

j) decreasing the VGA gain if the adaptable weighting factor is greater than a high threshold value;

wherein the adaptable weighting factor is set to the target value if the VGA gain is changed in steps i) and j).

18. The method of claim 15, wherein the transmitter is coupled to the receiver input by a transmission line in a backplane.

19. In a system including a receiver having an input and adjustable coefficients, a method comprising:

a) applying an input signal to the receiver input, the input signal having a first amplitude level insufficient to cause significant non-linear distortion in the receiver;

b) adapting the receiver to the applied input signal having the first amplitude level by adjusting the adjustable coefficients;

c) freezing at least one of the adjustable coefficients;

d) scaling the at least one frozen adjustable coefficients by a factor $\alpha$; and e) adjusting the amplitude of input signal to a second amplitude level, the second amplitude level being greater than the first amplitude level by the scale factor $\alpha$.

20. The method of claim 19, wherein the receiver continues to adapt to the input signal with the second amplitude level by adjusting the adjustable coefficients other than the at least one scaled frozen adjustable coefficient.

21. The method of claim 19, all of the adjustable coefficients are adjusted in step h).

22. The method of claim 19, wherein the receiver further includes a quantizer coupled to the receiver input, a decision feedback equalizer (DFE) coupled to the quantizer, a subtractor producing an error signal and haying a first input coupled to the receiver and a second input coupled to the quantizer, wherein the DFE adapts to the input signal in step b) in response to the error signal.

23. The method of claim 19, wherein the receiver further includes an AGC and a continuous-time linear equalizer (CTLE) disposed in series with the AGC, the AGC having an adaptable coefficient and the CTLE having at least one adaptable coefficient, wherein the adaptable coefficient of the AGC and the at least one adaptable coefficient of the CTLE are adapted in step b) and is stopped from adaptation in step c).

24. The method of claim 19, wherein a transmitter provides the input signal to the receiver input, controls the amplitude level of the input signal, and is coupled to the receiver input by a transmission line in a backplane.

25. The method of claim 22, wherein the receiver further includes a multiplier disposed between the quantizer and the second input of the subtractor and is responsive to an adaptable weighting factor, wherein the adaptation loop additionally adjusts the adaptable weighting factor in step b) and is not frozen in step c).

26. In a system including a receiver, the receiver having an input, a variable gain amplifier (VGA) coupled to the receiver input, a quantizer coupled to the VGA, a decision feedback equalizer (DFE) having at least one tap coefficient and coupled to the quantizer, a subtractor producing an error signal and having a first input coupled to receiver input and a second input coupled to the VGA, and a multiplier disposed between the quantizer and the second input of the subtractor and responsive to an adaptable weighting factor, a method comprising:

a) applying an input signal to the receiver input, the input signal having a first amplitude level insufficient to cause significant non-linear distortion in the receiver;

b) adapting the VGA gain, the adaptable weighting factor, and the DFE to the applied input signal having the first amplitude level by adjusting the at least one tap coefficient, the VGA gain, and the adaptable weighting factor in response to the error signal;

c) stopping the adaptations in step b);

d) scaling the at least one tap coefficient by a factor $\alpha$;

e) adjusting the amplitude of input signal to a second amplitude level, the second amplitude level being greater than the first amplitude level by the scale factor $\alpha$; and f) adapting the adaptable weighting factor to the applied input signal having the second amplitude level.

27. The method of claim 26, wherein the receiver further includes an adaptive timing loop for generating a clock signal from signals applied to the receiver input, and wherein the timing loop continues to adapt in step c).

28. The method of claim 26, wherein an attenuator is coupled to the receiver input and controls the amplitude level of the input signal in steps a) and e).

29. The method of claim 26, wherein the receiver includes a continuous-time linear equalizer (CTLE) disposed in series with the VGA, the CTLE having at least one adaptable coefficient adapted concurrently with the DFE.

30. The method of claim 26, wherein a transmitter supplies the input signal and controls the amplitude level of the input signal in steps a) and e).

31. The method of claim 26, wherein the step of adapting the VGA gain and the adaptable weighting factor to the applied input signal having the first amplitude level by adjusting the adaptable weighting factor in response to the error signal in step b) further comprises the steps of:

g) setting the VGA gain and the adaptable weighting factor to an initial value and a target value, respectively;

h) adjusting the adaptable weighting factor by a coefficient dependent on the error signal;

i) increasing the VGA gain if the adaptable weighting factor is less than a lower threshold value;

j) decreasing the VGA gain if the adaptable weighting factor is greater than a high threshold value;

wherein the adaptable weighting factor is set to the target value if the VGA gain is changed in steps i) and j).

32. The method of claim 30, wherein the transmitter is coupled to the receiver input by a transmission line in a backplane.

\* \* \* \* \*